Nov. 27, 1951     A. P. WATERSON     2,576,817
HYDRAULIC TRACER CONTROL UNIT
Filed April 1, 1948     5 Sheets-Sheet 1

INVENTOR.
ARTHUR P. WATERSON
BY
*Toulmin + Toulmin*
ATTORNEYS.

Nov. 27, 1951     A. P. WATERSON     2,576,817
HYDRAULIC TRACER CONTROL UNIT
Filed April 1, 1948     5 Sheets-Sheet 2

INVENTOR.
ARTHUR P. WATERSON
BY
Toulmin + Toulmin
ATTORNEYS.

Nov. 27, 1951     A. P. WATERSON     2,576,817
HYDRAULIC TRACER CONTROL UNIT
Filed April 1, 1948     5 Sheets-Sheet 3
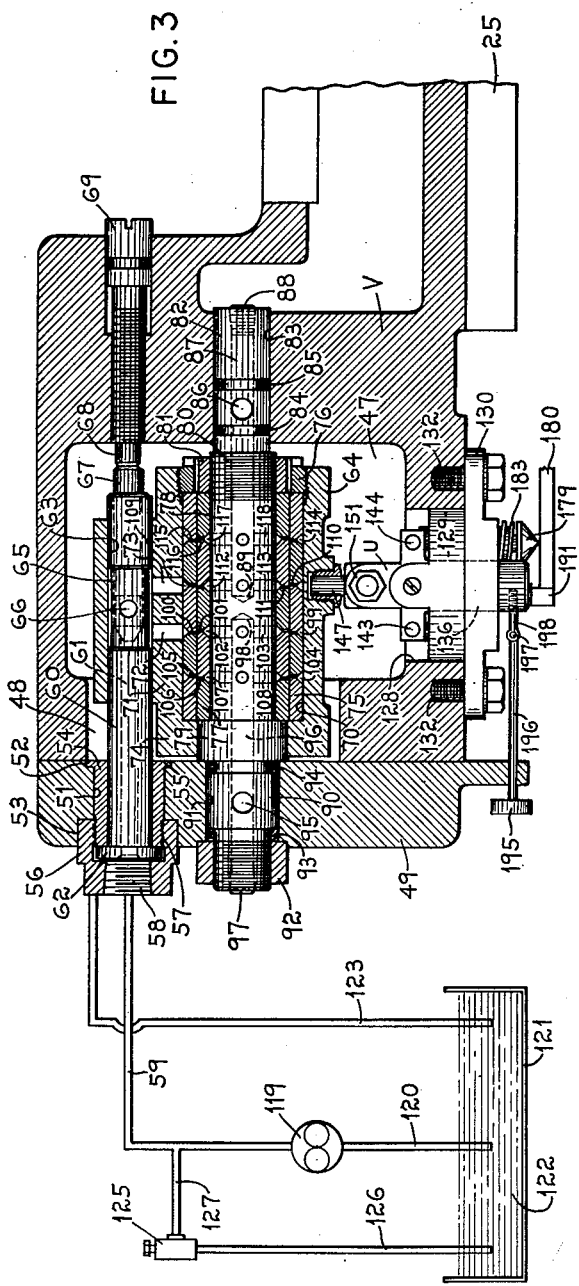
INVENTOR.
ARTHUR P. WATERSON
BY
Toulmin & Toulmin
ATTORNEYS.

Nov. 27, 1951 — A. P. WATERSON — 2,576,817
HYDRAULIC TRACER CONTROL UNIT
Filed April 1, 1948 — 5 Sheets-Sheet 4

INVENTOR.
ARTHUR P. WATERSON
BY
ATTORNEYS.

Nov. 27, 1951 A. P. WATERSON 2,576,817
HYDRAULIC TRACER CONTROL UNIT
Filed April 1, 1948 5 Sheets-Sheet 5
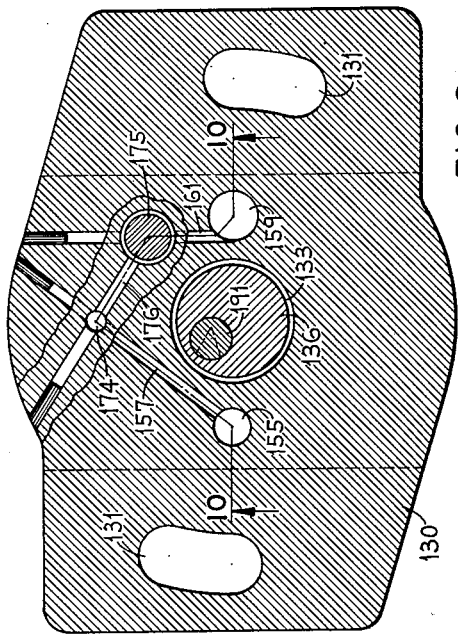
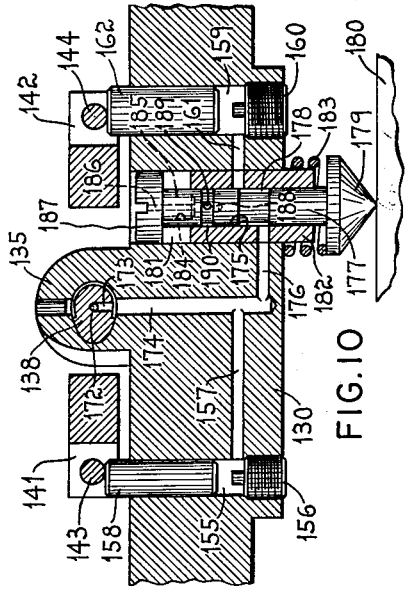
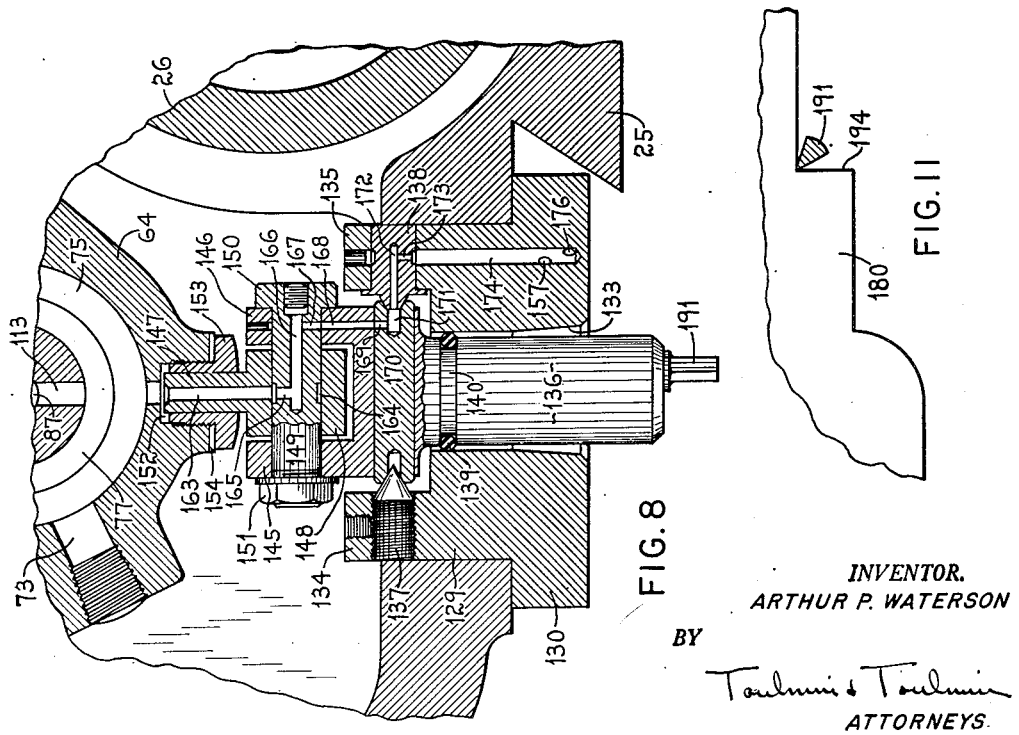
INVENTOR.
ARTHUR P. WATERSON
BY
ATTORNEYS.

Patented Nov. 27, 1951

2,576,817

UNITED STATES PATENT OFFICE 2,576,817

HYDRAULIC TRACER CONTROL UNIT

Arthur P. Waterson, Tulsa, Okla., assignor to The R. K. Le Blond Machine Tool Company, Cincinnati, Ohio, a corporation of Delaware Application April 1, 1948, Serial No. 18,427

8 Claims. (Cl. 82—14)

This invention deals with tracer control mechanisms that are employed in conjunction with a lathe to control the feeding of a tool to the work and is concerned primarily with tracer controls of the hydraulic type.

Ordinarily, a cross slide carries the tool which is either fed to or retracted from the work, depending on the finished contour of the latter. This cross slide is operatively mounted on a carriage which moves between the tailstock and the headstock of the lathe. It has been proposed to provide a template which, through the tracer control mechanism, governs the movement of the cross slide. With the known arrangements, a hydraulic cylinder and piston assembly are operatively asociated with the cross slide to cause its movement, and valve mechanism controls the delivery of a hydraulic medium under pressure to the cylinder.

Tracer control mechanisms embodying the above announced principles are characterized by the presence of valve mechanism which includes as an essential element a valve sleeve that is movable to determine to which end of the cylinder the hydraulic medium under pressure is being admitted and also the degree or amount of such pressure. This valve sleeve has generally been biased in one direction by a spring and in the opposite direction by a stylus that engages the edge of the template. An example of a tracer control of this type is illustrated and described in the copending application of Arthur P. Waterson, Serial Number 743,669, filed April 24, 1947, and now Patent No. 2,474,134, granted June 21, 1949.

The present invention has in view as its foremost objective the provision of a tracer control of the type indicated which includes hydraulic means for normally biasing the valve sleeve to cause the latter to so affect the cylinder and piston assembly as to maintain the tool in its retracted position. The tracer control unit also includes another hydraulic means which is capable of overcoming the first mentioned hydraulic means so as to affect the valve sleeve to cause the cylinder and piston assembly to feed the tool to the work. As a practical matter, it is the differential between these two hydraulic means which is effective on the valve sleeve.

In providing a tracer control unit in accordance with the above noted object, a rocker member is pivotally mounted and has one end in operative engagement with the valve sleeve. The lower end of this rocker member carries a stylus which engages the edge of the template. This rocker member carries a pair of oppositely extending arms, each of which is engaged by an element of the hydraulic means aforesaid.

An important object of the invention is the provision in a tracer control unit of the type above indicated of mechanism that is operable by engagement with the template to render the differential between the two hydraulic means effective to place the valve sleeve under the control of this differential together with the stylus, the differential tending to normally urge the stylus against the edge of the template.

In carrying out this idea, a valve member is associated with the more powerful of said hydraulic means and is actuated by a rider having a conical head that is adapted to ride up onto the template. When this rider is out of engagement with the template, the valve member assumes a closed position with respect to the more powerful of the hydraulic means so that the latter is rendered ineffective. Under this condition, the first hydraulic means is effective on the main valve sleeve to cause the latter to assume a position in which the hydraulic medium under pressure that is delivered to the cylinder and piston assembly retracts the tool. When the rider engages the template, the valve member aforesaid is opened and hydraulic medium under pressure is delivered to the more powerful of the hydraulic means. Thus, the first hydraulic means which previously had been effective is overcome and the main valve sleeve placed under the control of the differential together with the stylus that engages the edge of the template. Various other detailed features and advantags of the invention are tied up with this phase of the operation of the tracer control unit.

A tracer control unit embodying the above principles is particularly adapted for use on the carriage of a lathe that is automatically reversed in its direction of movement to provide a cycle of operation that is completely automatic. Thus, when the end of a template is reached and the rider rides thereoff, the tool is retracted and remains in its retracted position during the return of the carriage to its initial starting point. As the rider rides onto the template and the stylus engages the edge thereof, the tool is again fed to the work. Another highly important object of the invention is the provision of means for completing this automatic cycle by causing the rider to ride onto the template and the stylus to engage the edge thereof at the end of the return movement. This means may take the form of a cam arm or guide which acts on the unit in the desired manner.

In the operation of a lathe including a tracer control unit of the type with which this invention is concerned, there may be instances when it will be desirable to interrupt the automatic cycle. Thus, a further object of the invention is the provision in a tracer control unit of the type indicated of manually operable means which may be availed of as occasion demands to affect the rocker element aforesaid and overcome the differential which normally would be effective to cause feeding of the tool and move the valve sleeve into position causing retraction of the tool.

In providing a tracer control unit of the character above noted, nicety and accuracy of operation depend on proper functioning of the various hydraulic instrumentalities. The presence of any air pockets in the hydraulic medium is to be avoided as they might impair this accuracy of operation. Thus, a further object of the invention is the provision of a tracer control unit of the type indicated which is characterized as including a main bore that is normally filled with the hydraulic medium with the exhaust being located at a higher lever than the intake. During the operation of the lathe this hydraulic medium is placed under pressure by a pump that is included in the system in a well-known manner. By locating the exhaust or return connection above the intake or port where the medium is delivered under pressure, the danger of air pockets is substantially eliminated.

As the stylus of the tracer control unit moves along the edge of the template it, of course, encounters any curves or shoulders of the template which determine the contour of the finished work. In the case of abrupt shoulders such as those which are at an angle of substantially 90 degrees to the axis of the spindle, some difficulty has been experienced in proper actuation of the stylus upon engagement with such shoulders. The present invention proposes to obviate this difficulty by adjustably mounting the hydraulic unit on the cross slide so that it is angularly adjustable through a small range. Thus, the unit may be adjusted to cause the stylus to engage abrupt shoulders at an angle more favorable than it has heretofore been possible to attain.

Various other more detailed objects and advantages of the invention such as arise in connection with carrying out the above noted ideas in a practical embodiment will in part become apparent and in part be hereinafter stated as the description of the invention proceeds.

The invention therefore comprises a tracer control unit for a lathe which provides an automatic cycle of operation which may be interrupted as occasion demands and which unit includes hydraulic means which is effective through a rocker element on a main valve sleeve to normally cause the tool to be retracted but which hydraulic means may be overcome by a second and more powerful hydraulic means that is controlled by the engagement or disengagement of a rider on the template. The rocker element carries a stylus that engages the edge of the template and this stylus, together with the differential between the hydraulic means, determines the feed of the tool.

The tracer control unit is designed for the elimination of air pockets by locating the exhaust or outlet port higher than the intake or inlet port in the main bore of the unit. The unit is also mounted for angular adjustment so as to present the stylus to abrupt shoulders at favorable angles.

For a full and more complete understanding of the invention, reference may be had to the following description and accompanying drawings wherein:

Figure 3 is a composite view including a diagrammatic representation of the hydraulic system and developing a section through the tracer control unit about on the planes represented by the lines 3—3 of Figure 2.

Figure 4 is an enlarged detailed sectional view taken about on the plane represented by the line 4—4 of Figure 2.

Figure 8 is an enlarged detailed sectional view through the mechanism shown in Figure 5, this view being taken about on the plane represented by the line 8—8 of Figure 5.

Figure 9 is an enlarged detailed sectional view taken on horizontal planes which are represented by the lines 9—9 of Figures 5 and 6.

Figure 10 is a sectional view that is developed on the vertical sections represented by the lines 10—10 of Figure 9.

Figure 11 is an enlarged detailed showing bringing out the manner in which the stylus engages a right angle shoulder of the template.

General enviroment

Figure 1:
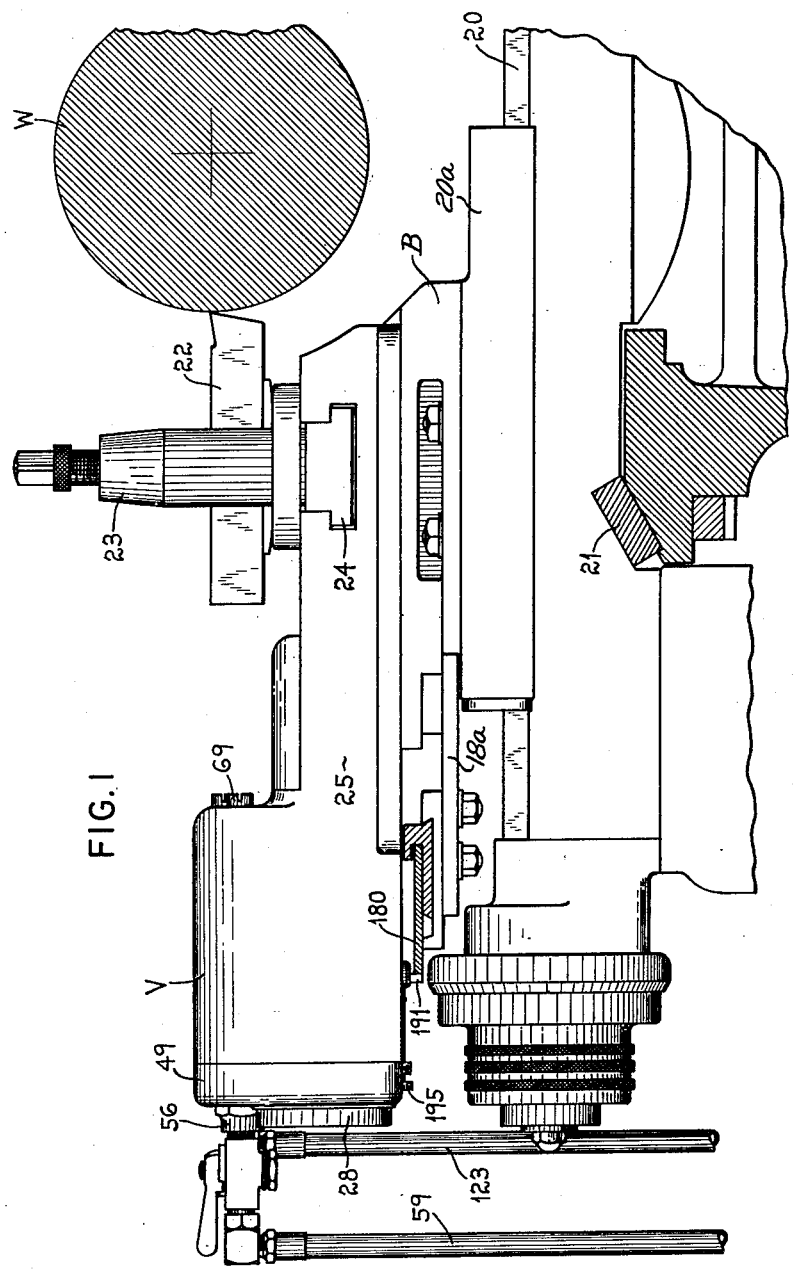
Figure 1 is a view mostly in elevation and taken normal to the spindle axis of a lathe bringing out the elements of a lathe with which the tracer control unit of this invention is concerned.

The tracer control unit of this invention is intended to be applied to a lathe which includes the usual tailstock and headstock (not illustrated) between which is mounted the work as represented at W. The carriage of the lathe which is represented at 20 travels back and forth between the tailstock and headstock in a well-known manner which is not a part of this invention. One of the ways on which the carriage so travels is shown at 21.

The tool which engages the work is shown at 22 and is carried by a post represented at 23 which is adjustably mounted by a T head and slot connection as shown at 24 on a tool slide 25. This tool slide 25 is mounted for movement toward and away from the work W which is caused by the cylinder and piston assembly that is illustrated in Figure 4.

Referring to Figure 4, a cylinder 26 is shown as being anchored to the tool slide 25. The outer end of this cylinder is threaded as shown at 27 and screwed into these threads is a plug 28 that carries a packing ring 29. This plug 28 functions as one head of the cylinder. Immediately adjacent to the head 28 the cylinder 26 is formed with an annular groove with which communicates a passage 31.

The opposite end of the cylinder 26 is also threaded as indicated at 32 and screwed into these threads is a plug 33 having an enlarged head 34 which is snugly received in a bore 35 formed in the slide 25. A gasket shown at 36 seals the connection between the head 34 and the bore 35.

The member 33 and 34 constitutes the head for the cylinder at that end and is formed with a passage 37 which slidably receives a rod 38 with a packing ring 39 sealing the connection between the two. Adjacent to the plug 33 the cylinder 26 is formed with an annular groove 40 with which communicates a passage 41. The cylinder 26 has a bore 42 in which is slidably positioned a piston 43 that is anchored to the rod 38 by a nut shown at 44. The other end of the rod 38 is anchored to a bracket 45 by a nut shown at 46 and this bracket 45 is immovably affixed to the bottom swivel slide B mounted on the lathe cross slide 20a of the lathe.

It is evident that if a hydraulic medium under pressure is admitted through passage 31 and groove 30 to the bore 42 on one side of the piston 43 the cylinder 26 will be moved to the left, speaking with reference to the showing of Figure 4. On the other hand, if the hydraulic medium under pressure admitted through passage 41 and groove 40 to the bore 42 on the opposite side of the piston 43, the tool slide 25 will be moved to the right.

*Main control valve*

Figure 2:
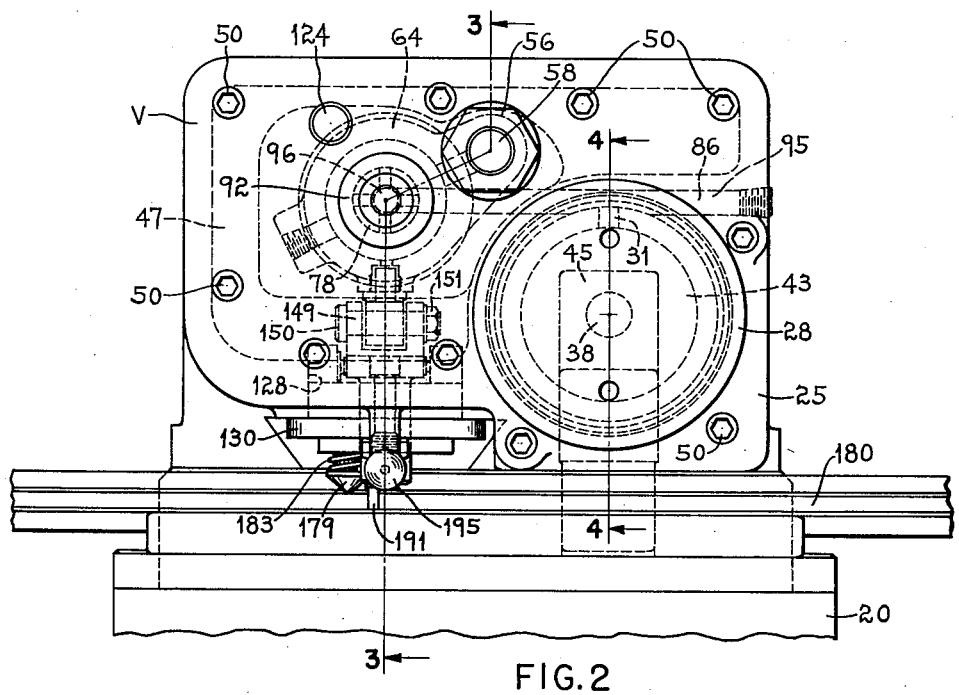
Figure 2 is a view in end elevation of the tracer control unit, this view being taken normal to the plane of the showing of Figure 1.

The tool slide 25 at its outer free end is formed with a valve casing referred to generally at V and which defines a chamber 47 which has an open end at 48 that is normally closed by a closure plate 49 that is anchored to the casing V by the bolts shown at 50 in Figure 2.

The closure plate 49 is formed with a cylindrical opening 51 which is counterbored at each end as indicated at 52 and 53, respectively, A ferrule 54 is received in the opening 51 and has a head 55 received in the counterbore 52. The opposite end of the ferrule 54 is threaded and a cup-shaped coupling member 56 has internal threads 57 which are screwed onto these threads of the ferrule 54, the cup-shaped member 56 being received in the counterbore 53. This member 56 is formed with a threaded opening 58 into which is screwed a fitting (not illustrated) which conductively connects a conduit 59 thereto.

A tubular conduit 60 having a bore 61 and a head 62 is carried by the ferrule 54 with the head 62 engaging the end of the ferrule and positioned within the coupling 56. This conduit 60 extends back into the chamber 47 and is slidably received within a bore 63 that is formed in a valve sleeve unit 64.

Substantially midway of the bore 63, the conduit 60 is cut away to provide a wide annular groove 65 which communicates with the bore 61 through a radial passage 66. The conduit 60 is continued into the chamber 47 past the end of the bore 63 where it is formed to receive a needle valve 67 which is engaged by a correspondingly reduced end 68 of a stop screw 69 that is mounted in the casing V.

The valve sleeve unit 64 is formed with a main bore 70 that is separated from the bore 63 by a wall 71. Passages 72 and 73 communicate between the bore 63 at the location of the groove 65 to the bore 70. The bore 70 is partially closed at one end by an inturned flange 74 and abutting this flange is a series of collars forming a sleeve 75. A ring nut 76 is screwed into the opposite end of the bore 70 which is threaded and holds this sleeve 75 assembled within the sleeve unit 64. An inner sleeve 77 also comprising a series of collars is positioned within the sleeve 75 and snugly encompasses a valve rod 78. The latter is formed with an enlargement at 79 providing a shoulder against which the inner sleeve 77 abuts. The valve rod 78 is threaded as shown at 80 over a zone remote from enlargement 79 and a nut 81 is screwed onto these threads and engages the inner sleeve 77 to clamp the latter between the nut and the enlargement 79.

The valve rod 78 has an inner end portion 82 which is received in an opening 83 formed in the casing V and a pair of gaskets 84 and 85 seal the connection. Between the gaskets 84 and 85 the rod 78 is formed with a radial passage 86 that communicates at its outer end with the passage 41. At its inner end the radial passage 86 communicates with a bore 87 which extends from the end of the rod 78 that is closed by the plug 88 to a point at 89 just short of the midpoint of the sleeve 64.

The opposite end of the rod 78 has an end part 90 that is received in a bore 91 formed in the closure plate 49 and a nut 92 is screwed onto the outer threaded portion of this rod 90 to hold the latter in position. A pair of gaskets 93 and 94 seal the connection between the part 90 of the rod 78 and the bore 91 of the cover plate and a radial passage 95 is formed in the part 90 and communicates at its outer end with the passage 31. At its inner end it communicates with a bore 96 which extends from the outer end of the rod where it is closed by a plug 97 to a point slightly spaced from the midpoint of the sleeve unit 64 as shown at 98.

It is evident that the inner sleeve 77 is anchored to the rod 78 as it is clamped between the enlargement 79 and the nut 81. Likewise, the outer sleeve 75 is held immovable with respect to the sleeve unit 64 as it is clamped between the inturned flange 74 and the nut 76. While the rod 78 is immovable the sleeve unit 64 is movable within the chamber 47 by mechanism to be later described with the relative movement taking place between the sleeves 75 and 77.

The outer sleeve 75 is formed with a V-shaped groove 99 which communicates with the passage 72. Communicating with the apex of this groove 99 are a plurality of ports 100 of small diameter. Under certain conditions these ports 100 align or overlap to some degree with respect to ports 101 formed in the inner sleeve 77. The latter in turn communicate with the apex of a V-shaped groove 102 which opens onto radial passages 103 that communicate with the bore 96. Thus, whether or not hydraulic medium under pressure will pass from bore 61 to the bore 96 depends on whether or not the ports 100 and 101 are in communication and the degree of pressure will depend on the extent to which these ports overlap.

The outer sleeve 75 is also formed with a V-shaped groove 104 which communicates with the chamber 47. Ports 105 communicate with the apex of the groove 104 and are adapted to either align or partially overlap ports 106 formed in the inner sleeve 77. The latter communicate with a V-shaped groove 107 which in turn communicates with radial passages 108 that extend to the bore 96. Thus, whether or not communication between the chamber 47 and bore 96 is established depends on whether or not the ports 105 and 106 are in alignment and the degree of overlap will determine the extent of the communication.

The outer sleeve 75 is formed with an annular V-shaped groove 109 which communicates with the passage 73. Ports 110 communicate with the apex of the groove 109 and are adapted to align or partially overlap with ports 111 formed in the inner sleeve 77. These ports 111 open into the apex of a groove 112 with which communicate radial passages 113 which communicate at their inner ends with the bore 87. Thus, whether or not communication between the bore 61 and the bore 87 is established depends upon whether or not the ports 110 and 111 align and the degree of pressure which may be transmitted depends on the extent of the overlap.

The outer sleeve 75 is formed with an annular groove 114 which communicates with the chamber 47. Ports 115 communicate with the apex of this groove and are adapted to align or partially overlap ports 116 formed in the inner sleeve 77. These ports 116 communicate with a V-shaped groove 117 which in turn communicates with radial passages 118 that on their inner ends communicate with the bore 87. Thus, whether or not communication between the chamber 47 and the bore 87 is established depends on whether or not the ports 115 and 116 are in alignment and the degree of pressure which may be transmitted by the communication depends on the extent of the overlap.

Hydraulic system

As above noted, the coupling 56 provides a connection at 58 for the conduit 59. This may be taken as the intake or pressure inlet for the hydraulic system. The line 59 is connected to a pump shown at 119 which may be of any desired type and from the latter a conduit 120 extends to a reservoir 121 for a hydraulic medium which is shown at 122. An exhaust or outlet conduit 123 extends from an exhaust connection which is shown at 124 in Figure 2 to the reservoir 121. A pressure relief valve is shown at 125 and is connected by a conduit 126 to the reservoir 121 and by another conduit 127 to the conduit 59.

Briefly summing up the operation of the hydraulic system, it may be stated that the pump 119 supplies fluid under pressure to the intake 58 while fluid is exhausted from the connection at 124. The latter is located on a level higher than the intake 58 so that the chamber 47 is at all times filled with the hydraulic medium even when the device is not in operation so as to prevent the formation of air pockets.

Rocker unit

Figure 7:
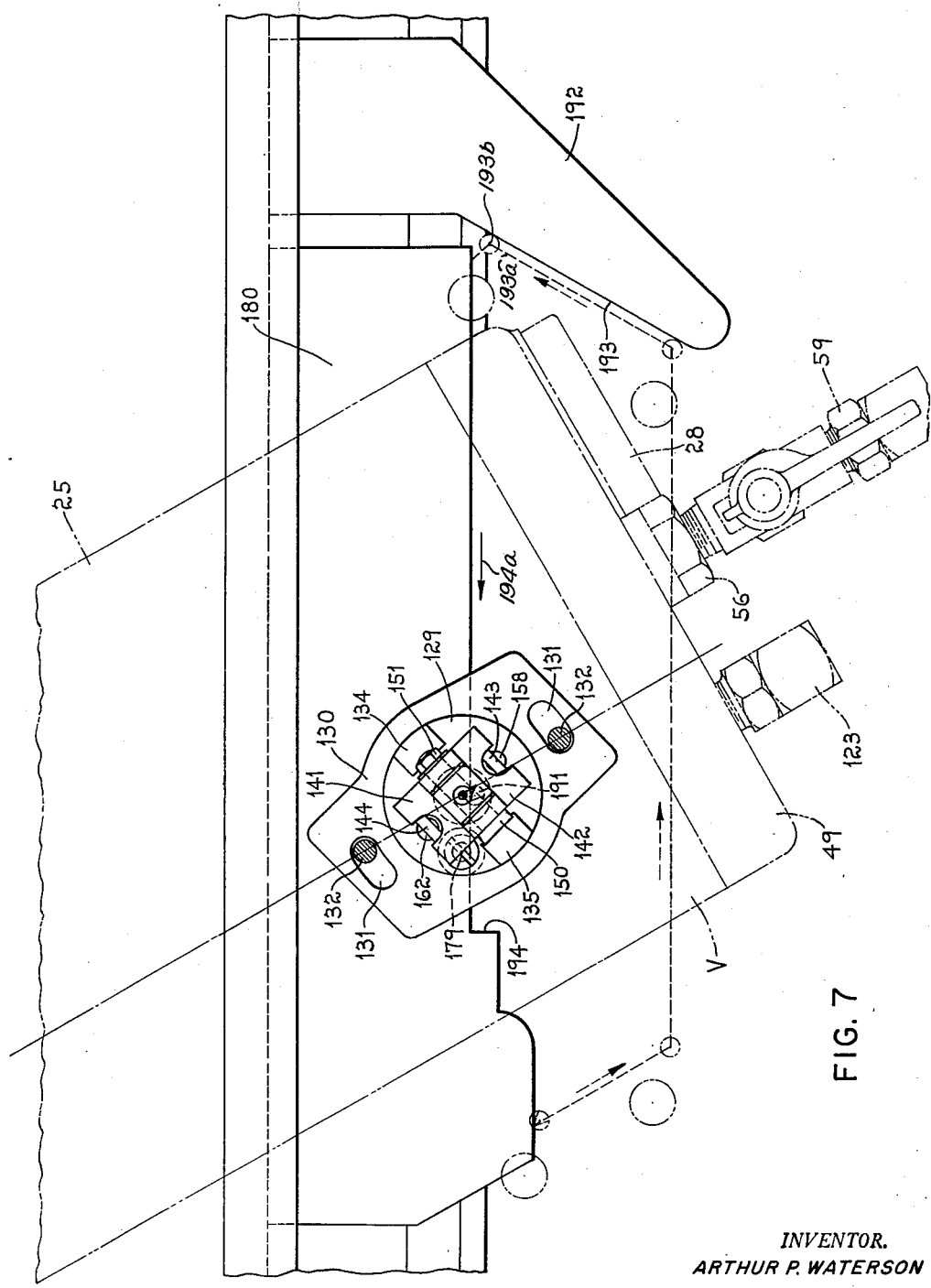
Figure 7 is a top plan view somewhat diagrammatic bringing out the angularly adjustable mounting of the unit.

The bottom wall of the casing V is formed with a circular opening 128 in which is positioned the rocker unit which is referred to in its entirety by the reference character U. This unit U comprises a circular part 129 which is snugly received within the opening 128 and a bottom flange 130 that is formed with openings 131 through which extend anchoring bolts 132. As shown in Figure 7 these openings 131 are arcuate in shape and permit of angular adjustment of the unit U in the opening 128.

The member 129 is formed with a central bore or passage 133 and a pair of ears 134 and 135 which are in alignment. A rocker member 136 is positioned in the bore 133 and is pivotally mounted between trunnions 137 and 138 which are carried by the ears 134 and 135 respectively. This member 136 has a certain amount of rocking movement in the passage 133. A ring 139 of O-shaped cross section is received in a groove 140 and serves to seal the connection between the rocker member 136 and the main body of the unit 129.

Outstanding from each side of the member 136 and substantially at the pivotal axis defined by the trunnions 137 and 138 are arms 141 and 142, each of which is cut away to provide a recess as shown in Figure 7. Extending across each of these recesses is an abutment rod, the one for the arm 141 being shown at 143 and the one for the arm 142 being shown at 144.

Above these cross arms 141 and 142 the rocker member 136 is provided with a bifurcated or forked construction defined by spaced ears 145 and 146. A connecting finger 147 carries at its lower end a lug 148 that is positioned between the ears 145 and 146. The lug 148 and ears 145 and 146 are formed with aligned openings through which passes a bolt 149 having a head 150 at one end and carrying a nut 151 at the other.

The sleeve unit 64 is formed with a recess 152 which is internally threaded. The finger 147 extends upwardly into this recess and is held in position therein by a thimble 153 that is externally threaded and screwed into the recess 152. A packing ring such as shown at 154 may be interposed between the head of this thimble and the sleeve unit 64.

Figure 5:
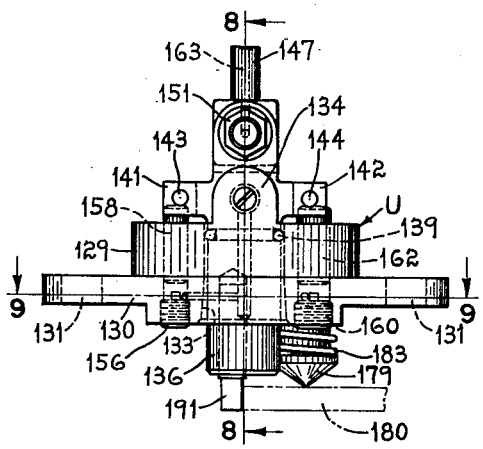
Figure 5 is an enlarged detailed view showing a part of the tracer control unit in elevation with certain passages depicted by broken lines.
Figure 6:
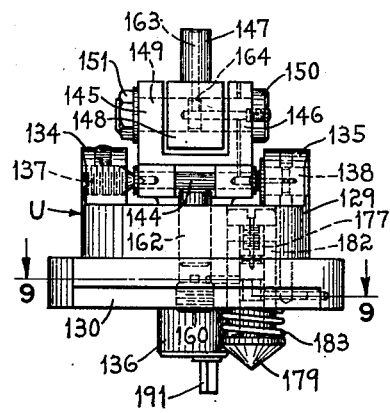
Figure 6 is a view similar to Figure 5 but taken on a plane normal thereto.

As is shown more clearly in Figures 5 and 10, the unit body 129 is formed with a bore 155 immediately beneath the abutment rod 143. The lower end of this bore is closed by a plug 156 and communicating therewith is a horizontal passage 157 whereby the bore is adapted to function as a hydraulic cylinder. A first fluid pressure actuating motor comprising a piston 158 is slidably positioned in the bore 155 and its upper end engages the abutment rod 143.

Immediately beneath the abutment rod 144 the unit body 129—130 is formed with a bore 159 which is closed at its lower end by a plug 160 and with which communicates a passage 161 whereby the bore 159 is adapted to function as a hydraulic cylinder. A second fluid pressure actuating motor comprising a piston 162 is slidably positioned in the bore 159 and engages the abutment rod 144. At this point, it is important to note that the bore 159 and piston 162 have a greater cross sectional area than the bore 155 and piston 158 for a purpose to be later described.

Referring now again more particularly to Figure 8, the finger 147 is formed with a passage 163 which communicates through the recess 152 with the groove 109. This passage 163 at its lower end communicates with an annular groove 164 formed in the bolt 149. A radial passage 165 establishes communication between the annular groove 164 and an axial passage 166. It is notable at this point that the lug 148 is movable whereas the bolt 149 is fixed. The annular groove 164 establishes the communication for any position of the finger 147 relative to the bolt.

Another radial passage 167 is formed in the bolt 149 and extends outwardly to the ear 146 where it communicates with a passage 168 formed therein. This passage 168 extends downwardly to another passage 169 formed in a bearing member 170 that receives the trunnion 138. The bearing member 170 is also formed with an axial passage 171 with which the passage 169 communicates. The trunnion 138 is formed with an axial passage 172 that is in alignment and communicates with the passage 171. The trunnion 138 is also formed with a radial passage 173 which communicates with the axial passage 172 at one end and at its outer end with a vertical passage 174 formed in the unit body 129. The passage 174 extends downwardly to the point where it communicates with the passage 157 which, it will be recalled, communicates with the bore 155.

Referring now more particularly to Figures 9 and 10, it will be noted the unit body 129 is also formed with a vertical bore 175 and, as shown in Figure 9, the passage 161 communicates with this bore 175. Another horizontal passage 176 establishes communication between the vertical bores 174 and 175. The bore 175 receives a valve member in the form of a piston 177 which is cut away at a point spaced from its end to provide a wide annular groove 178. When the piston 177 is in the downward position, communication to the passage 161 is cut off but when it is moved upwardly as will be later described, the annular groove 178 establishes communication between the passages 176 and 161 which, in effect, provides communication between vertical passage 174 and the bore 159.

The lower end of the piston 177 carries a conically shaped rider 179 that is adapted to ride onto the top face of a template 180 supported on a suitable bracket 180a connected to the swivel slide B as best seen in Figure 1. The unit part 130 is formed with a bore 181 into which is fixed a sleeve member 182 that is allowed to extend downwardly beyond the lower face of the unit 130. An expansion coil spring 183 is positioned around this sleeve and at its lower end engages the rider head 179. The normal tendency of this spring 183 is to urge the rider downwardly or outwardly.

This sleeve member 182 is formed with a bore 175 into which projects the piston 177. The latter is formed with a threaded socket 184 in which is threaded a screw member 185 formed with an axial passage 186 and an enlarged head 187, the latter being received in the bore 181. This head limits downward movement of the piston 177.

The passage 186 in the screw stem 185 opens into the socket in which the latter is received. Below this socket the piston 177 is formed with another axial passage 188 with which communicate radial passages 189 which in turn communicate with an annular groove 190. In the lower-most position of the valve piston 177, this groove 190 communicates with the passage 161 and thus provides an exhaust from the bore 159 through passage 161, groove 190, radial passages 189 and axial passages 188 and 186 to the chamber 47. This permits downward movement of the piston 162 under a condition to be later described.

The lower end of the rocker 136 carries a stylus 191 which engages the edge of the template 180 in the manner about to be described. This stylus preferably has the triangular sectional shape depicted in Figure 11.

*Operation*

In describing the operation of the above mechanism, attention is first directed to Figure 7 which shows the template 180 and also a guide arm 192 that presents a cam surface 193. This guide arm is located at the tailstock end of the lathe.

With rider 179 off of the top face of the template 180, gravity action plus the effect of the spring 183 forces the valve piston 177 downwardly. In its downward position the valve piston 177 cuts off communication between the bore 159 and the vertical passage 174 although exhaust communication from the bore 159 to the chamber 47 is established through passages 161, groove 190, etc. as above described. Under these conditions, the hydraulic medium under pressure is effective through the line of communications running from the recess 152 to the vertical bore 174. These may be briefly summed up as follows: axial passage 163, annular groove 164, radial passage 165, axial passage 166, radial passage 167, passage 168, radial passage 169, axial passages 171 and 172, and radial passage 173.

From the bore 174 the fluid under pressure is conducted through passage 157 to the bore 155 beneath the piston 158. This raises the latter and due to its abutment with the rod 143 the rocker is shifted to cause the sleeve unit 64 to be moved to the right, speaking with reference to the showing of Figure 3.

As the sleeve unit is so shifted, the ports 100 and 101 come into alignment and at the same time the ports 115 and 116 align. This means that hydraulic fluid under pressure is delivered to the bore 42 on the side of the piston 43 through the passage 31 and groove 30 and thereby retracts the slide 25 and tool carried thereby. At the same time that this retraction action takes place, fluid from the opposite side of the piston 43 is exhausted through passage 41 and the aligned ports 115 and 116 to the chamber 47.

Assuming that the carriage 20 is moved back towards the tailstock end of the machine and as the limit of such movement is approached, the stylus 191 engages the cam surface 193 of the bracket 192 fixed to the lathe bed so that the stylus member 136 is rocked to shift the valve sleeve 64 to retract the tool slide, the piston 158 being pressed downwardly, Figure 10, discharging the fluid in chamber 155 out through the relief valve 125, and with continued carriage movement to the right, the tool slide and tracer follow the broken line path 193a. As inward movement is continued to the point 193b the conical rider 179 rides up onto the top face of a template 180 causing the stylus to be shifted for inward movement of the tool slide. The stylus 191 is thus engaged with a side edge of the template. At this point, the carriage 20 is reversed manually or by suitable automatic means and begins to move towards the headstock as indicated by the arrow 194a. At the same time the rider 179 has forced the valve piston 177 upwardly so that the wide groove 178 now establishes communication between the passages 176 and 161. This means that hydraulic fluid under pressure is conducted from the bore 174 through passage 176, groove 178 and bore 175 to passage 161 and thence to bore 159 beneath the piston 162.

It will be recalled that the piston 162 has a greater cross sectional area than the piston 158. As the same hydraulic pressure is effective on both of these pistons, the piston 162 will prevail and overcome the piston 158 whereby it is moved upwardly against the rod 144 to rock the member 136 and thereby maintain the stylus in engagement with the edge of the template 180. The manner and degree in which the hydraulic medium under pressure is now delivered to either side of the piston 43 depends on the action of this stylus 191 and the effective differential between the two pistons 158 and 162 as determined by the edge of the template. Thus, if the stylus should reach a recess on the template which would indicate a reduced diameter in the work it will move inwardly into such recess and permit the piston 162 to rock the member 136 which would cause a shifting in the sleeve unit 64 so as to admit hydraulic fluid under pressure through the passage 41 and thereby feed the tool inwardly.

On the other hand, should the stylus 191 engage a shoulder such as shown at 194, it will shift the tracer valve sleeve 64 sufficiently for rapid retraction of the tool slide, overcoming the continued movement of the carriage in the direction 194a so that the tool will be retracted the required degree to move radially outwardly to form the shoulder 194.

At this point, it is well to note that the adjustable mounting provided for by the arcuate slots 131 permits the stylus to engage such shoulders as that shown at 194 at a favorable angle.

If at any time it is desired to interrupt the automatic cycle and have the tool retract, the operator may grasp the operating knob shown in 195 in Figure 3 and exert a pull on the link 196 which is pivotally connected as shown at 197 to a stem 198 that is threaded into a socket into the member 136. This causes a rocking of the latter in the direction which would normally be caused by the piston 158 and causes the tool to be retracted. It may be held in this retracted position until the beginning of the cycle is again reached or at any other point when it is desired to have the automatic cycle resume.

From the foregoing it is apparent that there has been provided a tracer control unit which includes hydraulic means for normally maintaining the tool in retracted position but may be overcome by a more powerful hydraulic means so that the differential between these two hydraulic means and engagement of the stylus with the edge of the template determines the feed of the tool to the work.

While a preferred specific embodiment of the invention is hereinbefore set forth, it is to be clearly understood that the invention is not to be limited to the exact devices, mechanisms, and hydraulic instrumentalities illustrated and described because various modifications of these details may be provided in putting the invention into practice within the purview of the appended claims.

What is claimed is:

1. In a tracer control unit, valve sleeve actuating means comprising a pivotally mounted rocker arm, means at one end of said arm for connecting it to a valve sleeve, a stylus at the other end of said arm adapted to engage the edge of a template, hydraulic means normally biasing said arm to move said stylus away from the edge of said template, and a second hydraulic means adapted to overcome the first said hydraulic means and move said stylus into engagement with said template edge under the differential which obtains between said hydraulic means.

2. In a tracer control unit, valve sleeve actuating means comprising a body member adapted to be mounted on a tool slide, a rocker arm pivotally mounted in said body member, means at one end of said rocker arm for operatively connecting it to a valve sleeve, a stylus at the lower end of said arm adapted to engage the edge of a template, said body member being formed with a pair of cylinders of different cross sectional area, a piston in each of said cylinders, means for operatively connecting each of said pistons to said rocker arm whereby each piston tends to rock said arm in a direction opposite to that caused by the other of said pistons, and means for connecting said cylinders to a common source of supply of hydraulic medium under pressure.

3. In a tracer control unit, valve sleeve actuating means comprising a body member adapted to be mounted on a tool slide, means for rendering said mounting adjustable whereby the angular position of said body relative to said slide may be varied, a rocker arm pivotally mounted in said body member, means at one end of said rocker arm for operatively connecting it to a valve sleeve, a stylus at the lower end of said arm adapted to engage the edge of a template, said body member being formed with a pair of cylinders of different cross sectional area, a piston in each of said cylinders, means for operatively connecting each of said pistons to said rocker arm whereby each piston tends to rock said arm in a direction opposite to that caused by the other of said pistons, and means for connecting said cylinders to a common source of supply of hydraulic medium under pressure.

4. In a tracer control unit, valve sleeve actuating means comprising a body member adapted to be mounted on a tool slide, a pin and arcuate slot connection included in said mounting whereby the angular position of said body with respect to said slide may be adjusted, a rocker arm pivotally mounted in said body, means for connecting one end of said rocker arm to a valve sleeve, a stylus at the other end of said rocker arm adapted to engage a template edge, a first hydraulic means normally biasing said rocker arm to move said stylus away from said edge, and a second hydraulic means adapted to be rendered effective to overcome the first said hydraulic means and move said stylus into engagement with said template edge.

5. In a tracer control unit, valve actuating mechanism comprising a body member formed with a central bore, a rocker arm in said bore and pivotally mounted on said body member, said body member being formed with a pair of spaced cylindrical bores of different diameters and a passageway adapted to receive a hydraulic medium under pressure, said body member being formed with a transverse passage connecting the cylindrical bore of smaller diameter to said passageway and a second cross passage connecting the cylinder of larger diameter to said passageway, a piston in each of said cylindrical bores, a valve member controlling communication through said second cross passage, means operatively connecting said pistons to said rocker arm to cause said pistons to be effective on said rocker arm in opposite directions, and operating means for said valve.

6. In a tracer control unit, valve sleeve actuating means comprising a body member having a central bore, a rocker arm in said bore and pivotally mounted on said body above said bore, means at the upper end of said arm for operatively connecting said arm to a valve sleeve, a stylus at the lower end of said arm adapted to engage the edge of a template, a pair of cross arms outstanding from said rocker arm at opposite sides over said body, said body being formed with a pair of cylindrical bores beneath said cross arms and of different cross sectional area, a piston in each of said cylindrical bores and in operative engagement with the cross arm thereabove, said body member being formed with a vertical passage adapted to receive a hydraulic medium under pressure, said rocker arm being formed with conduits conducting said hydraulic medium from said valve sleeve to said vertical passage, a cross passage connecting said vertical passage with the cylindrical bore of smaller diameter, said body also being formed with a valve cylinder, a cross passage connecting said valve cylinder with said vertical passage, another cross passage connecting said valve cylinder with the cylindrical bore of larger diameter, a valve piston in said valve cylinder, and a rider carried by the lower end of said valve piston and adapted to engage said template to operate said valve piston.

7. In a hydraulic tracer control unit for a lathe having a swivel slide mounted on the cross slide, a tool slide movably mounted on said swivel slide, a fluid pressure actuating cylinder interconnected between said swivel slide and tool slide to effect movement of said tool slide, a source of fluid pressure connected through a tracer valve to control the operation of said motor, a stylus for actuating said tracer valve, a pivotal mounting for supporting said stylus on said tool slide, a template, supported on said swivel slide, arranged to engage said stylus, a first fluid pressure motor connected to actuate said stylus in a direction to cause retraction of the tool slide from a workpiece in said lathe, a second fluid pressure motor connected to actuate said stylus in the opposite direction to cause said tool slide to move toward said workpiece, means for connecting said source of fluid pressure at all times to said first fluid pressure motor, means for connecting said source of fluid pressure through a control valve carried on said tool slide to said second fluid pressure motor, an operating plunger in said control valve adapted to be engaged by said template to close off said valve, and yielding means for normally urging said valve plunger to an open position of said valve when said valve plunger is disengaged from said template.

8. In a hydraulic tracer control unit for a lathe having a swivel slide mounted on the cross slide, a tool slide movably mounted on said swivel slide, a fluid pressure actuating cylinder interconnected between said swivel slide and tool slide to effect movement of said tool slide, a source of fluid pressure connected through a tracer valve to control the operation of said motor, a stylus for actuating said tracer valve, a pivotal mounting for supporting said stylus on said tool slide, a template, supported on said swivel slide, arranged to engage said stylus, a first fluid pressure motor connected to actuate said stylus in a direction to cause retraction of the tool slide from a workpiece in said lathe, a second fluid pressure motor connected to actuate said stylus in the opposite direction to cause said tool slide to move toward said workpiece, means for connecting said source of fluid pressure through said tracer valve and said pivotal mounting, directly to said first fluid pressure motor, and through a control valve to said second fluid pressure motor, a control member in said valve adapted to engage said template upon movement of said tool slide to cut off the supply of fluid pressure to said second fluid motor and connect said motor to discharge, and resilient means acting on said control member for said valve to maintain said valve in normally open condition when said control member is disengaged from said template.

ARTHUR P. WATERSON.

REFERENCES CITED

The following references are of record in the file of this patent:

UNITED STATES PATENTS

| Number | Name | Date |
| --- | --- | --- |
| 2,311,987 | Jackson | Feb. 23, 1943 |
| 2,373,265 | Salisbury | Apr. 10, 1945 |
| 2,424,031 | Heer | July 15, 1947 |
| 2,437,570 | Von Zelewsky | Mar. 9, 1948 |
| 2,456,158 | Tancred | Dec. 14, 1948 |
| 2,473,584 | Hallberg et al. | June 21, 1949 |